United States Patent [19]

Baker et al.

[11] 4,166,152

[45] Aug. 28, 1979

[54] TACKY POLYMERIC MICROSPHERES

[75] Inventors: William A. Baker, Stillwater; Warren D. Ketola, St. Paul, both of Minn.

[73] Assignee: Minnesota Mining and Manufacturing Company, St. Paul, Minn.

[21] Appl. No.: 825,259

[22] Filed: Aug. 17, 1977

[51] Int. Cl.$^2$ .................. C08F 20/10; C08F 20/14
[52] U.S. Cl. .................. 428/522; 260/29.6 R; 526/200; 526/201; 526/203; 526/328; 526/328.5
[58] Field of Search .................. 526/328.5, 200, 201, 526/203, 328; 260/29.6 R; 428/522

[56] References Cited

U.S. PATENT DOCUMENTS

| | | | |
|---|---|---|---|
| 3,513,120 | 5/1970 | Pohlemann et al. | 526/200 |
| 4,049,604 | 9/1977 | Morehouse et al. | 526/203 |

*Primary Examiner*—Harry Wong, Jr.
*Attorney, Agent, or Firm*—Cruzan Alexander; Donald M. Sell; Gerald F. Chernivec

[57] ABSTRACT

Infusible, solvent-insoluble, solvent-dispersible, inherently tacky, elastomeric polymeric microspheres which are formed from non-ionic monomers and comprise at least one oleophilic water-emulsifiable alkyl acrylate or methacrylate ester, and a suspension polymerization technique for producing the microspheres, which includes the use of an ionic suspension stabilizer.

10 Claims, No Drawings

4,166,152

TACKY POLYMERIC MICROSPHERES

BACKGROUND OF THE INVENTION

This invention relates to inherently tacky, elastomeric, solvent-dispersible, solvent-insoluble, polymeric microspheres and a process for preparing same.

In U.S. Pat. No. 3,691,140 to Silver, there are disclosed inherently tacky acrylate copolymer microspheres comprising a major portion of at least one alkyl acrylate ester and a minor portion of an ionic monomer.

As discussed in the Silver patent, the microspheres can be unexpectedly prepared by suspension polymerization techniques, which historically have been considered unsuitable for preparation of tacky polymers. In the technique described by Silver, the microspheres are prepared utilizing an emulsifier in an amount greater than the critical micelle concentration in the absence of externally added protective colloids or the like. The Silver microspheres are copolymeric in nature and require an ionic comonomer as an essential component thereof.

It has now been found that inherently tacky microspheres having physical properties similar to those of the Silver patent, i.e., inherent tack, infusibility, solvent dispersibility, and solvent insolubility, can be prepared which are not limited to copolymers, but may also be homopolymers, and do not contain an ionic comonomer. The microspheres are prepared by aqueous suspension polymerization, but have as an essential ingredient in their preparation a hereinafter defined suspension stabilizer.

SUMMARY OF THE INVENTION

In accordance with the invention there are provided inherently tacky, infusible, solvent-insoluble, solvent-dispersible, elastomeric polymeric microspheres which are formed from non-ionic monomers and are comprised of at least one oleophilic, water-emulsifiable alkyl acrylate or methacrylate ester.

The microspheres of the invention are prepared by an aqueous suspension polymerization technique utilizing emulsifiers in an amount greater than the critical micelle concentration, in combination with an ionic suspension stabilizer.

DETAILED DESCRIPTION OF THE INVENTION

Useful alkyl acrylate or methacrylate ester monomers are those which are oleophilic, water-emulsifiable, of restricted water-solubility, and which, as homopolymers, generally have glass transition temperatures below about −20° C. Exemplary alkyl acrylate and methacrylate ester monomers which are suitable for preparation of the microspheres of the invention include n-butyl acrylate, secbutyl acrylate, 2-methyl butyl acrylate, 4-methyl-2-pentyl acrylate, 2-ethyl hexyl acrylate, isooctyl acrylate, isodecyl methacrylate, and the like. Alkyl acrylate and methacrylate ester monomers with glass transition temperatures higher than −20° C. (i.e., butylmethacrylate, isobornyl acrylate, or the like) may be utilized in conjunction with one of the above-described monomers as long as the glass transition temperature of the resultant polymer is below about −20° C.

Additionally, the tacky nature of the microspheres can be varied by inclusion of a minor portion of a non-acrylate or methacrylate ester comonomer which is non-ionic and water insoluble, such as divinyl benzene, N-t-octylacrylamide, etc.

The microspheres of the invention are prepared by an aqueous suspension polymerization technique utilizing at least one emulsifier in a concentration greater than the critical micelle concentration. The critical micelle concentration is that minimum emulsifier concentration necessary for the formation of micelles, and is slightly different for each emulsifier, usable concentrations typically ranging from about $1.0 \times 10^{-4}$ to about 3.0 moles per liter.

The emulsifiers used for the successful preparation of the inherently tacky microspheres of this invention are preferably anionic in nature, typical examples being sodium dodecylbenzene sulfonate, sodium salts of alkylaryl ether sulfonates, and the like. Non-ionic emulsifiers, e.g., ethoxylated oleyl alcohol, can also be utilized alone or in conjunction with anionic types. In this latter instance, it is preferred that the anionic emulsifier predominates.

Catalysts or polymerization initiators for polymerizing the monomers to provide the microspheres of the invention are those which are normally suitable for free-radical polymerization of acrylate monomers, and which are oil-soluble and of very low solubility in water such as, for example, benzoyl peroxide. The use of water-soluble catalyst may cause formation of substantial amounts of latex, the extremely small particle size and solvent solubility of which are undesirable.

Concentration of catalysts may affect sphere quality and therefore, should be on the order of about 0.15 to about 0.66 percent by weight of the total monomers, and more preferably about 0.25 to about 0.45 percent by weight. Catalyst concentrations below about 0.15 percent by weight may tend to cause agglomeration of the microspheres, whereas concentrations greater than about 0.66 percent may result in low molecular weight polymers which do not exhibit all of the desired properties.

Ionic suspension stabilizers that assist in the preparation of the microspheres can be characterized by an interfacial tension of at least about 15.0 dynes per centimeter. Interfacial tension herein means the value determined between the monomer phase and a 1.0 percent by weight aqueous solution of the stabilizer. To determine the interfacial tension, a standard test, ASTM #D-1331-56, entitled "Standard Methods of Tests for Surface and Interfacial Tension of Solutions of Surface Active Agents" can be utilized. If the interfacial tension between the monomer phase and the 1.0 percent by weight aqueous solution of stabilizer falls below about 15.0 dynes per centimeter, there is insufficient stabilization of the final polymerized droplets and agglomeration may occur.

The approximate concentration of any single stabilizer required for successful preparation of the tacky microspheres of this invention can also be determined by the value of the interfacial tension. Typically, increasing interfacial tension values between the monomer phase and the aqueous stabilizer phase corresponds to a reduction in required concentration of the particular stabilizer for the successful preparation of the microspheres. Stabilizer concentrations greater than about 10 percent by weight based on the monomer may tend to provide less than optimum properties to the resultant suspension.

Exemplary stabilizers include salts of polyacrylic acid of greater than about 5000 molecular weight (e.g., the ammonium, sodium, lithium, and potassium salts), carboxy modified polyacrylamides (e.g., "Cyanamer A-370" from American Cyanamid), copolymers of acrylic acid and dimethylaminoethylmethacrylate and the like, quaternary amines (e.g., General Analine and Film's "Gafquat 755", a quaternized polyvinyl-pyrollidone copolymer, or Union Carbide's "JR-400", a quaternized amine substituted cellulosic), and carboxy modified cellulosics (e.g., Hercules' "Natrosol CMC Type 7L", sodium carboxy methylcellulose). The following is a table indicating representative stabilizers, their interfacial tension with the monomer phase, and the concentration level found to be required for successful microsphere preparation.

Table I

| Stabilizer Trade Name | Class | Interfacial Tension Between Isooctyl-acrylate and 1.0% Solution of Stabilizer in H₂O dynes per cm. | Approximate Level for Successful Preparation of Isooctyl-acrylate Homopolymer (Weight Percent Based on Monomer) |
|---|---|---|---|
| None | 50/50 copolymer of acrylic acid and dimethylamino ethyl-methacrylate | 21.2 | 1.0% |
| Good Rite K714 | Polyacrylic acid (neutralized with ammonia) | 21.0 | 1.0% |
| GAF Gafquat 755 | Quaternized polyvinyl pyrollidone copolymer | 18.2 | 1.0% |
| Union Carbide JR-400 | Quaternized cellulosic | 18.5 | 1.0% |
| Cyanamer A-370 | Carboxy modified polyacrylamide | 21.0 | 3.0% |
| Natrosol CMC Type 7L | Sodium carboxy-methylcellulose | 19.8 | 5.0% |
| Gantrez HYM | Copolymer of polyvinylmethylether and maleic anhydride (neutralized with ammonia) | 15.4 | 10.0% |

Although some stabilizers may function at levels greater than 10 percent based on monomer, the resultant suspensions may become undesirable for several reasons, e.g., they may contain too large an amount of undesirable latex polymer. Furthermore, control of final particle size can become difficult because of the high viscosities involved and excess concentration levels may also lead to detackification of the resultant polymer spheres.

Following polymerization, the aqueous suspension of polymer microspheres is stable to agglomeration or coagulation under room temperature conditions. The polymer suspension may have non-volatile solids contents from about 10 to about 50 percent by weight. Upon prolonged standing, the suspensions may separate into two phases, one phase being aqueous and substantially free of polymer, the other phase being an aqueous suspension of the polymer spheres. The degree and type of separation is dependent on the density of the resultant polymers. Separation of the polymer phase provides a low viscosity aqueous suspension having a non-volatile solids content on the order of about 75 percent which, if shaken with water, will readily redisperse.

If desired, the aqueous suspension of microspheres may be utilized immediately following polymerization to provide inherently tacky coatings or adhesives. The aqueous suspension may also be coagulated with methanol, saturated salt solutions, or the like, followed by washing and drying. These dried polymer spheres, with sufficient agitation, will readily disperse in a wide variety of common organic solvents. Once the polymer is dried, however, it is not redispersible in water.

The polymer microspheres are typically small in size, having diameters in the range of about 1 to about 250 microns, the diameter of the majority of the spheres being in the range of from about 5 to about 150 microns. The spheres are normally tacky and elastomeric, are insoluble in organic solvents, and form dispersions in most common solvents except such highly polar solvents as water, methanol, and ethanol. Typical useful solvents are ethyl acetate, tetrahydrofuran, heptane, 2-butanone and other ketones, benzene, cyclohexane, and isopropanol and higher alcohols. When dispersed in such solvents, the microspheres absorb the solvent and swell to about twice their original diameter, or about 8 times their original volume. After dispersion, the microspheres, which contain about 80 percent solvent, remain homogeneously dispersed for extended periods of time. A force applied directly to one of the polymer spheres will deform it; however, the spherical shape is reassumed upon release of the stress. Upon being heated, the spheres typically do not melt or flow, but retain their integrity until their carbonization temperature is reached.

The microspheres can be utilized in aerosol adhesives, they can be applied to substrates as an adhesive, they can be mixed with binder materials, and placed on substrates to provide repeatedly reusable adhesive surfaces, such as disclosed in U.S. Pat. No. 3,857,731, and they can be combined with a hot melt adhesive on a substrate to provide a positionable hot melt adhesive system, as is disclosed in commonly assigned and copending U.S. application Ser. No. 742,743 of Loder et al.

The invention will now be more specifically described by the following non-limiting examples, wherein all parts are by weight unless otherwise specified.

EXAMPLE 1

To a 3 liter, 3-necked flask equipped with thermometer, reflux condenser, mechanical stirrer, and vacuum and nitrogen inlet tube, were charged 1407.7 grams of deionized water and 27.0 grams of "Good Rite K714" (tradename for a 15 percent solids aqueous solution of polyacrylic acid of 200,000 molecular weight, commercially available from the B. F. Goodrich Co.). The contents of the flask were then agitated until all of the polyacrylic acid was dissolved, and concentrated ammonium hydroxide was added thereto until a pH of 7.0 was obtained.

To this solution were added 500 grams of isooctylacrylate and 1.75 grams of "Lucidol 70" (tradename for a 70 percent active benzoylperoxide catalyst commercially available from Lucidol Division, Pennwalt Corporation). A vacuum was then placed on the contents of the flask, the pressure therein being drawn to 28 inches of mercury and held for one minute to assure removal of dissolved air and oxygen. The vacuum was then broken with nitrogen. A nitrogen purge was kept over the batch throughout the reaction period. Five grams of an emulsifier, "Siponate DS-10" (tradename for a commercially available sodium dodecyl benzene sulfonate, commercially available from Alcolac, Inc.) were added to the mixture and the agitation was set at 400 rpm.

The batch was then heated to 60° C. and maintained for 16 hours. As the temperature initially approached 60° C., a mild exotherm was noted to approximately 70° C., at which time cooling was not applied until cessation of the exotherm, after which the flask was maintained at 60° C. After the 16 hour period, the suspension was allowed to cool to room temperature, and the resulting suspension polymer was filtered through a 60 mesh screen. The resultant homopolymer contained 25.14 percent solids, and upon standing, the polymer spheres creamed to the surface but were easily redispersed. Average particle size of the polymer spheres was from 10 to 20 microns.

EXAMPLES 2–5

These examples were prepared utilizing the equipment, monomer, and general procedure outlined in Example 1 and illustrate the use of various stabilizers and anionic emulsifiers. The microspheres were found to be inherently tacky, infusible, and insoluble but dispersible in organic solvents.

Table II

| Example | Emulsifier | Stabilizer | Percent Solids | Average Polymer Particle Size, Microns |
|---|---|---|---|---|
| 2 | 5g sodium dodecylbenzene sulfonate | 5g 50—50 molar ratio copolymer of acrylic acid and dimethylaminoethylmethacrylate | 24.3 | 66.1 |
| 3 | 5g sodium dodecylbenzene sulfonate | 5g GAF Gafquat 755 | 25.8 | 52 |
| 4 | 5g sodium dodecylbenzene sulfonate | 15g Cyanamer A-370 from American Cyanamid | 25.2 | 8.7 |
| 5 | 5g sodium salt of alkyl aryl polyether sulfonate | 5g 50—50 molar ratio copolymer of acrylic acid and dimethylaminoethylmethacrylate | 27.2 | 63.8 |

EXAMPLE 6–9

These examples were prepared utilizing the equipment and procedures outlined in Example 1, and illustrate the preparation of inherently tacky microspheres from different monomers, using 5 grams of sodium dodecylbenzenesulfonate as the emulsifier, and 5 grams of a 50/50 mole ratio copolymer of acrylic acid and dimethylaminoethylmethacrylate as the stabilizer.

Table III

| Example | Monomer | Percent Solids | Average Polymer Particle Size, Microns |
|---|---|---|---|
| 6 | n-butylacrylate | 19.2 | 48.4 |
| 7 | isodecylmethacrylate | 25.4 | 59.2 |

Table III-continued

| Example | Monomer | Percent Solids | Average Polymer Particle Size, Microns |
|---|---|---|---|
| 8 | 60/40 weight ratio isooctylacrylate n-butylacrylate | 25.4 | 39.7 |
| 9 | 95/5 weight ratio isooctylacrylate N-t-octylacrylamide | 24.5 | 45.4 |

EXAMPLE 10

This example illustrates the use of a non-ionic surfactant and was prepared using the same equipment and techniques described in Example 1. The monomer was isooctylacrylate (500 grams). The stabilizer was a 50/50 molar ratio copolymer of acrylic acid and dimethylaminoethylmethacrylate (5 grams), and the emulsifier was "Siponic Y-500-70", tradename for an ethoxylated oleyl alcohol from Alcolac, Inc. (5 grams). The aqueous suspension of inherently tacky microspheres prepared in this manner contained 25.3 percent nonvolatile material and had an average particle size of 37.4 microns.

What is claimed is:

1. Infusible, solvent-insoluble, solvent-dispersible, inherently tacky, elastomeric polymeric microspheres formed from non-ionic monomers and comprising a major portion of at least one oleophilic, water-emulsifiable alkyl acrylate or methacrylate ester, said polymeric microspheres having a glass transition temperature below about −20° C., and having been prepared by aqueous suspension polymerization in the presence of at least one anionic emulsifier at a concentration level above said emulsifier's critical micelle concentration and an ionic suspension stabilizer having an interfacial tension of at least about 15.0 dynes per centimeter.

2. The microspheres of claim 1 wherein said ester is selected from the group consisting of n-butyl acrylate, sec-butyl acrylate, 2-methyl butyl acrylate, 4-methyl-2-pentyl acrylate, 2-ethyl hexyl acrylate, isooctyl acrylate, isodecyl methacrylate.

3. The microspheres of claim 1 wherein said microspheres are homopolymers and said ester is isooctylacrylate.

4. An article comprising a substrate having disposed on at least one surface thereon infusible, solvent-insoluble, solvent-dispersible, inherently tacky, elastomeric polymeric microspheres formed from non-ionic monomers and comprising a major portion of at least one oleophilic, water-emulsifiable alkyl acrylate or methacrylate ester, said polymeric microspheres having a glass transition temperature below about −20° C., and having been prepared by aqueous suspension polymerization in the presence of at least one anionic emulsifier at a concentration level above said emulsifier's critical micelle concentration and an ionic suspension stabilizer having an interfacial tension of at least about 15.0 dynes per centimeter.

5. The article of claim 4 wherein said ester is selected from the group consisting of n-butyl acrylate, secbutyl acrylate, 2-methyl butyl acrylate, 4-methyl-2-pentyl acrylate, 2-ethyl hexyl acrylate, isooctyl acrylate, isodecyl methacrylate.

6. The article of claim 4 wherein said microspheres are homopolymers and said ester is isooctyl acrylate.

7. A suspension polymerization process for preparing infusible, solvent-insoluble, solvent-dispersible, inherently tacky, elastomeric polymeric microspheres comprising the steps of:
(a) charging to a reaction vessel
  (i) at least one alkyl acrylate or methacrylate ester monomer; and
  (ii) at least one anionic emulsifier at a concentration above its critical micelle concentration; and
  (iii) a substantially water-insoluble polymerization initiator; and
  (iv) an ionic suspension stabilizer, having an interfacial tension of at least about 15.0 dynes per centimeter;
(b) agitating the reaction vessel charge to create an emulsion;
(c) heating said emulsion while maintaining said agitation;
whereby elastomeric, solvent-dispersible polymeric microspheres are formed from said emulsion.

8. The process of claim 7 wherein said ester monomer is selected from the group consisting of n-butyl acrylate, sec-butyl acrylate, 2-methyl butyl acrylate, 4-methyl-2-pentyl acrylate, 2-ethyl hexyl acrylate, isooctyl acrylate, isodecyl methacrylate.

9. The process of claim 7 wherein said initiator is present at from about 0.15 to about 0.66 percent by weight of said monomer.

10. The process of claim 7 wherein said stabilizer is present at up to about 10 percent of said monomer.

* * * * *

REEXAMINATION CERTIFICATE (3761st)

United States Patent [19]

Baker et al.

[11] B1 4,166,152

[45] Certificate Issued  May 18, 1999

[54] TACKY POLYMERIC MICROSPHERES

[75] Inventors: William A. Baker, Stillwater; Warren D. Ketola, St. Paul, both of Minn.

[73] Assignee: Minnesota Mining & Manufacturing Comp., St. Paul, Minn.

Reexamination Request:
No. 90/003,513, Aug. 2, 1994

Reexamination Certificate for:
Patent No.: 4,166,152
Issued: Aug. 28, 1979
Appl. No.: 08/825,259
Filed: Aug. 17, 1977

[51] Int. Cl.$^6$ .................... B32B 27/30; C08F 20/10; C08F 120/10; C08F 220/10
[52] U.S. Cl. .................... 428/522; 526/200; 526/201; 526/203; 526/328; 526/328.5
[58] Field of Search .................... 428/522; 526/200, 526/201, 203, 328, 325.5

[56] References Cited

U.S. PATENT DOCUMENTS

| | | |
|---|---|---|
| 3,243,419 | 3/1966 | Ingram . |
| 3,620,988 | 11/1971 | Cohen . |
| 3,691,140 | 9/1972 | Silver . |
| 3,912,581 | 10/1975 | Fink . |
| 4,112,213 | 9/1978 | Waldman . |

FOREIGN PATENT DOCUMENTS 444257  4/1936  United Kingdom .

*Primary Examiner*—Edward J. Smith

[57] ABSTRACT

Infusible, solvent-insoluble, solvent-dispersible, inherently tacky, elastomeric polymeric microspheres which are formed from non-ionic monomers and comprise at least one oleophilic water-emulsifiable alkyl acrylate or methacrylate ester, and a suspension polymerization technique for producing the microspheres, which includes the use of an ionic suspension stabilizer.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–6 is confirmed.

Claims 7–10 are cancelled.

* * * * *